United States Patent [19]
Dominguez

[11] Patent Number: 4,883,340
[45] Date of Patent: Nov. 28, 1989

[54] SOLAR LIGHTING REFLECTOR APPARATUS HAVING SLATTED MIRRORS AND IMPROVED TRACKER

[75] Inventor: Richard L. Dominguez, Glendale, Ariz.

[73] Assignee: Solar Lighting Research, Inc., Glendale, Ariz.

[21] Appl. No.: 227,239

[22] Filed: Aug. 2, 1988

[51] Int. Cl.$^4$ .................... G02B 17/00; G02B 27/00; F24J 2/38
[52] U.S. Cl. .................... 350/260; 126/425; 250/203 R
[58] Field of Search ............... 350/258, 260, 264, 263; 362/35, 32; 126/425; 136/246; 250/203 R

[56] References Cited

U.S. PATENT DOCUMENTS

| | | | |
|---|---|---|---|
| 3,709,583 | 1/1973 | Pfannkuch et al. | 350/260 |
| 4,203,426 | 5/1980 | Matlock et al. | 126/425 |
| 4,246,477 | 1/1981 | Latter | 350/262 X |
| 4,297,000 | 10/1981 | Fries | 350/265 X |
| 4,349,245 | 9/1982 | Kliman | 126/425 X |
| 4,429,952 | 2/1984 | Dominguez | 350/258 |
| 4,620,771 | 11/1986 | Dominguez | 350/258 |

Primary Examiner—Richard A. Wintercorn
Attorney, Agent, or Firm—Cahill, Sutton & Thomas

[57] ABSTRACT

A solar lighting apparatus for illuminating the interior of a roofed building includes a reflector assembly rotatable about a vertical axis for tracking daily movements of the sun. The reflector assembly includes multiple planar reflector panels each extending about a horizontal axis and supported between a pair of opposing, parallel side frame members inclined upwardly toward their rear ends at approximately a 25° angle to the horizontal. The reflector panels are oriented in their operative position at right angles to the side frame members and are inclined at approximately a 65° angle to the horizontal. The reflector panels are spaced apart from one another by a distance approximating the width of each panel to prevent leading reflector panels from shading trailing reflector panels. Each of the reflector panels is secured to the side frame members about a pivotal connection for allowing the reflector panels to be rotated to a compact shipping position lying substantially within the plane defined by the side frame members. The reflector assembly is supported by a rotatable support ring geared to a drive motor selectively powered from a storage battery that is in turn charged by a first photovoltaic panel. A solar tracking circuit selectively couples the storage battery to the drive motor for rotating the reflector assembly. A second smaller photovoltaic panel directly powers the tracking circuitry to avoid draining the storage battery. The tracking circuitry prevents false tracking under cloudy-bright conditions, and automatically seeks the sun following extended hours of overcast conditions.

17 Claims, 3 Drawing Sheets

FIG_6  FIG_7

FIG_8  FIG_9

SOLAR LIGHTING REFLECTOR APPARATUS HAVING SLATTED MIRRORS AND IMPROVED TRACKER

BACKGROUND OF THE INVENTION

1. Field of the Invention

The present invention relates generally to a solar lighting reflector apparatus for illuminating the interior of a roofed building, and more particularly, to a solar lighting reflector apparatus having a slatted reflector panel array and an improved solar tracking mechanism for tracking daily movements of the sun.

2. Description of the Prior Art

A variety of measures have been taken to harness the energy of the sun to conserve our limited natural resources. Solar collectors have been used to heat water and other working fluids, and photovoltaic panels have been used to generate electricity from solar energy. In addition, sunlight has been used to illuminate the interiors of buildings. Simple skylights formed in rooftops have long been used to help illuminate buildings. However, such skylights fail to adequately illuminate the interior of a building unless the sun is relatively high in the sky. More recently, skylights supplemented with tracking reflector assemblies have proven to be an economically preferred alternative to electrical lighting in commercial and industrial buildings.

U.S. Pat. No. 4,114,186, entitled "LIGHTING FIXTURE", and issued to the present applicant, discloses a solar lighting fixture which, in one embodiment thereof, includes a telescoping cylindrical light duct including a rotatable upper portion having a pivotally connected reflective lid. Drive motors are provided for rotating the upper portion of the disclosed lighting fixture to follow movements of the sun, as well as to open and close the reflective lid.

U.S. Pat. No. 4,429,952, entitled "TRACKING REFLECTOR ASSEMBLY FOR A SKYLIGHT", and issued to the present applicant, describes a tracking reflector assembly for use in conjunction with a skylight. The reflector assembly includes a ring-shaped base member rotatably supported above the skylight, as well as a reflective panel pivotally coupled to the ring-shaped base member. A horizontal drive motor engages the ring-shaped base member to horizontally rotate the reflective panel, and a vertical drive motor secured to the rear face of the reflective panel operates in conjunction with a pair of rack arms for raising and lowering the reflector. Control circuitry, including various photosensors, is disclosed for selectively operating the horizontal and vertical drive motors to automatically track daily and seasonal movements of the sun. A darkness sensor is also provided for returning the reflector assembly to the east at the end of each day.

The aforementioned U.S. Pat. No. 4,429,952 discloses certain solar tracking circuitry for maintaining the reflector directed toward the sun for tracking daily east-to-west movements of the sun. In particular, this patent discloses the use of a photosensor and an associated shade to control the horizontal drive mechanism. The photosensor is normally shaded when the reflector extends toward the sun, and continued westerly movement of the sun causes direct sunlight to subsequently strike the photosensor to trigger further rotation of the reflector assembly toward the west until the photosensor is again shaded. This patent also discloses a vertical tracking photosensor arrangement wherein a pair of photosensors are positioned behind and on opposing sides of a V-shape shade for sensing changes in the elevation of the sun.

U.S. Pat. No. 4,620,771, entitled "COMBINED SOLAR TRACKING REFLECTOR AND PHOTOVOLTAIC PANEL", also issued to the present applicant, discloses a solar tracking reflector apparatus wherein one or more photovoltaic panels are coupled to the solar lighting reflector apparatus for rotational movement therewith in order to generate electrical power for operating the horizontal and vertical drive motors, as well as the control circuitry related thereto. This patent further discloses a horizontal tracking control arrangement using a pair of photosensors and a shade which prevents sunlight from directly striking one of the two photosensors when the reflector assembly falls behind westerly movements of the sun. A control circuit detects the imbalance between the signals generated by the pair of photosensors in order to advance the reflector assembly further to the west.

U.S. Pat. No. 3,709,583 issued to Pfannkuch et al. discloses a slatted reflector assembly used in conjunction with a skylight wherein the slatted reflectors are mounted in a frame which tracks daily movements of the sun. However, the slatted reflectors disclosed in this patent are formed of prismatic surfaces for reflecting away from the skylight those direct rays of sunlight which strike the slats from a particular range of angles. Accordingly, the reflective slats disclosed by this patent intercept and reflect away, rather than supplement, the direct rays of sunlight which would otherwise enter the skylight dome.

Similarly, U.S. Pat. No. 3,884,414, issued to Baer, discloses a series of louver panels mounted in a frame for use in conjunction with a standard skylight. However, the device disclosed in this patent merely positions the panels to avoid interference with the direct rays of sunlight that would ordinarily strike the skylight, without reflecting additional amounts of sunlight into the skylight.

While the solar lighting reflector apparatus disclosed in the aforementioned U.S. Pat. Nos. 4,429,952 and 4,620,771 have been well received by commercial users, the solar lighting reflector apparatus described in such patents is nonetheless characterized by certain drawbacks. For example, during normal daytime usage, the upper portions of the reflective panel extend four to five feet above the roof and are often visible from the street along which such buildings are located. Apart from detracting from the aesthetic appearance of such buildings, many cities have implemented certain building ordinances prohibiting mechanical equipment installed upon the roof of a commercial building from being visible from the street level. Such building ordinances have occasionally prevented potential commercial users of such solar lighting reflector apparatus from being able to make use thereof.

In addition, the one-piece reflective panels shown in the aforementioned Pat. Nos. 4,429,952 and 4,620,771 can be subjected to rather large wind drag forces on windy days. The presence of unusually high winds requires that the reflective panels be lowered to their horizontal position to avoid damage to the solar lighting reflector apparatus. Accordingly, a mechanical wind sensor and associated electronics are needed to activate the shutdown of such reflective panels under high wind conditions. Little, if any, available daylight can enter the solar lighting reflector apparatus described in such patents during periods when the reflective panel has been lowered due to high wind conditions.

The one-piece reflective panels shown in U.S. Pat. Nos. 4,429,952 and 4,620,771 also fail to distribute reflected light uniformly into the associated skylight under certain conditions. For example, when the sun is at a relatively low angle in the sky, such as during early morning or late afternoon, the reflective panel tends to reflect sunlight primarily upon the rear portion of the skylight, while reflecting very little, if any, sunlight upon the forward portion of the skylight. Similarly, when the sun is relatively high in the sky, as during the noontime portions of summer days, the reflective panel tends to shade the rearmost portion of the skylight while permitting the forwardmost portion of the skylight to receive direct rays of sunlight. When the light entering the skylight is spread thereover in a nonuniform manner, the light transmitted to the interior illuminated space of the building is also typically less uniform.

Additionally, the solar lighting reflector apparatus disclosed in U.S. Pat. Nos. 4,429,952 and 4,620,771 requires a vertical drive motor and related control circuitry for raising the reflective panel at the beginning of each day, lowering the reflective panel at the end of each day, and perhaps raising and lowering the angle of the reflective panel throughout the day to track vertical movements of the sun. One or more geared rack arms cooperate with the vertical drive motor to raise and lower the reflective panel. The required vertical drive motor and related rack arms significantly add to the bulk and complexity of the unit, thereby complicating shipment of the unit prior to installation, as well as complicating maintenance of the unit following installation. Moreover, the electrical power requirements of the vertical drive motor mandate that a relatively large storage battery and relatively large photovoltaic panel be utilized for stand-alone installations, wherein the solar lighting reflector apparatus must generate its own electrical power for operation.

The tracking and control circuitry disclosed in the aforementioned U.S. Pat. Nos. 4,429,952 and 4,620,771 can also present certain disadvantages on occasion. For example, for stand-alone installations wherein the solar lighting reflector apparatus generates all of its own electrical power, the control circuitry is continuously powered and continuously places a drain on the storage battery. During multiple-day periods of extended overcast conditions, the electrical drain placed upon the storage battery by the control circuitry can partially discharge the storage battery, thereby jeopardizing proper operation of the drive motors.

In addition, the control circuitry disclosed in U.S. Pat. Nos. 4,429,952 and 4,620,771 includes a separate darkness sensor for detecting sunset in order to initiate the return of the reflector to an easterly direction for a facing the sunrise on the following morning. The addition of a separate darkness sensor adds to the complexity and cost of such units.

As mentioned above, the control circuitry disclosed in U.S. Pat. Nos. 4,429,952 and 4,620,771 includes photosensitive elements for tracking east-to-west movements of the sun each day to rotate the reflector apparatus about a vertical axis to follow the sun. While such control circuitry typically operates without problems during bright, clear sunny days, problems may arise under cloudy conditions. For example, under cloudy-bright conditions, sunlight may be reflected by or dispersed by the clouds to strike a photodetector that would otherwise have been shaded from direct rays of sunlight. The result is that the control circuitry falsely signals the horizontal drive motor to advance the reflector apparatus in an attempt to once again shade the photodetector. This so-called runaway condition can cause the reflector apparatus to be advanced to its full due-west position even though the sun may still be in the eastern or southern sky.

A further problem which has been discovered with the tracking apparatus and control circuitry disclosed in the two aforementioned patents is the situation wherein the sun is hidden by the clouds during the morning and mid-day hours, but comes out from behind the clouds in the afternoon. During such conditions, the reflector apparatus might never be advanced from its initial due-east position, since the photodetector used to sense east-to-west movement of the sun never receives a sufficient amount of light to trigger the horizontal drive motor. By the time that the sun ultimately comes out from behind the clouds, the sun approaches the reflector apparatus from behind the reflector panel, with the result that the photodetector used to trigger the horizontal drive motor is never illuminated. Thus, although there is enough sunlight in the late afternoon to illuminate the interior of the building, the reflector apparatus remains directed due east.

Accordingly, it is an object of the present invention to provide a solar lighting reflector apparatus incorporating a low preofile reflector assembly for illuminating the interior of a building and being less visible from the street along which such building is located.

It is still another object of the present invention to provide such a solar lighting reflector apparatus which produces significantly reduced wind drag forces under windy conditions, thereby avoiding the need to lower the reflector assembly when relatively high winds are blowing.

It is yet another object of the present invention to provide such a solar lighting reflector apparatus wherein the reflector assembly is easily converted from a compact shipping position to a deployed, operative position.

It is still another object of the present invention to provide such a solar lighting reflector apparatus including a reflector assembly which more uniformly spreads sunlight across an associated skylight dome when the sun is at relatively low elevational angles, as well as when the sun is more directly overhead, as during the noontime portion of summer days.

A further object of the present invention is to provide such a solar lighting reflector apparatus which avoids the need for a vertical drive motor and associated rack arms, which additionally avoids the need for control circuitry used to operate a vertical drive motor, and which further avoids the need for relatively large photovoltaic panels and storage batteries for creating and storing electrical power to operate the vertical drive motor.

A still further object of the present invention is to provide such a solar lighting reflector apparatus including control circuitry which is powered in such a manner as to avoid placing any drain upon a storage battery used to provide power to the horizontal drive motor.

A yet further object of the present invention is to provide such a solar lighting reflector apparatus and related control circuitry wherein a separate darkness sensor is not required to trigger the return of the apparatus to its due east position at the end of each day.

An additional object of the present invention is to provide such a solar lighting reflector apparatus including solar tracking control circuitry which inhibits the aforementioned "runaway" situation brought about by cloudy-bright conditions during which the horizontal drive motor is continuously operated in a futile attempt to find the position of the sun.

A further object of the present invention is to provide such a solar lighting reflector apparatus having solar tracking control circuitry adapted to seek out the position of the sun once the sun comes out from behind the clouds after extended hours of overcast conditions.

These and other objects of the present invention will become more apparent to those skilled in the art as the description thereof proceeds.

SUMMARY OF THE INVENTION

Briefly described, and in accordance with one embodiment thereof, the present invention relates to a solar lighting reflector apparatus having a slatted reflector assembly composed of multiple reflective panels for reflecting light into a light transmissive opening, such as skylight, formed upon a roof of a building for illuminating the interior of the building. The reflector apparatus includes a base, such as a geared support ring, mounted for rotation about a vertical axis above the light transmissive opening. Each of the reflective panels extends along a generally horizontal axis between first and second ends, each of the reflective panels extending generally parallel to one another. The multiple reflective panels are supported by the rotatable support ring for rotation therewith. The rearmost reflective panel is supported at a higher elevation than the frontmost reflective panel to prevent the frontmost reflective panel from shading the rearmost reflective panel at low sun angles. A tracking mechanism, including a horizontal drive motor, is provided for rotating the base and the multiple reflective panels supported thereby, to track daily movements of the sun and to maintain the reflective panel assembly directed toward the sun throughout the day.

In the preferred embodiment of the present invention, a pair of substantially linear side frame members are supported above and on opposing sides of the geared support ring for rotation therewith. The side frame members are spaced apart by a predetermined distance commensurate with the length of the reflective panels, the side frame members extending generally parallel to one another. Each of the side frame members includes opposing front and rear ends, each side frame member extending upwardly at an incline from its front end toward its rear end. Each reflective panel is secured at its first end to one of the side frame members and is secured at its second end to the other of its side frame members. Preferably, each of the side frame members is inclined at an angle of approximately 25° to the horizontal, and each of the reflective panels extends at right angles to the side frame members and is thereby inclined at an angle of approximately 65° to the horizontal.

Each of the reflective panels is secured to the side frame members about a pivotal connection for allowing each reflective panel to be pivoted between an inoperative position lying substantially within the plane of the side frame members, to an operative position extending at right angles to the side frame members. Additionally, the reflective panels are spaced apart from one another by approximately the width of each such reflective panel; this spacing permits the reflective panels to be rotated fully into the plane of the side frame members to assume a compact shipping position, and further serves to space apart the reflective panels in their operative positions to prevent the leading reflective panels from shading the trailing reflective panels.

Another aspect of the present invention relates to the control circuitry for operating the horizontal drive motor for rotating the reflector assembly to face the sun, and more particularly, to the manner in which the control circuitry is electrically powered. In this regard, the present invention includes a reflector supported upon a rotatable base for reflecting solar light into the light transmissive opening of a roofed building for illuminating the interior thereof. A drive motor rotates the base and the reflector, and a storage battery is provided for storing electrical power used to operate the drive motor. A first photovoltaic panel generates electrical power to charge the storage battery. Tracking circuitry is also provided for detecting the position of the sun and for generating control signals that indicate the position of the sun. Control circuitry is coupled to the tracking circuitry and is responsive to the control signals generated thereby for selectively coupling electrical power from the storage battery to the drive motor for rotating the base and the reflector to follow daily movements of the sun. A second photovoltaic panel generates electrical power and is coupled to the tracking circuitry and control circuitry for supplying electrical power thereto. In this manner, the tracking circuitry and control circuitry are powered independently of the storage battery and do not drain any power therefrom. Preferably, both the first and second photovoltaic panels are mounted for rotation along with the reflector to be continuously directed toward the sun.

Another aspect of the present invention relates to the manner in which the aforementioned second photovoltaic panel not only generates electrical power for the tracking circuitry and control circuitry but further serves the function of a darkness sensor for causing the reflector to rotate back to the east at the end of each day. As the sun sets, the electrical output produced by the second photovoltaic panel decreases; the control circuitry is responsive to the decreased electrical output of the second photovoltaic panel for operating the drive motor in the reverse direction to rotate the base and reflector back toward the east to face the sun on the following morning.

Another aspect of the present invention relates to a solar lighting reflector apparatus having an improved tracking arrangement for preventing a so-called runaway condition under cloudy-bright skies. The solar lighting reflector apparatus again includes a base rotatably supported above a light transmissive opening formed in the roof of a building, and further includes a reflector supported for rotation with the base to reflect solar light through the light transmissive opening to illuminate the interior of the building. A drive motor is also provided for rotating the base and the reflector under the control of control circuitry. First and second photodetectors are supported for rotation with the reflector and are positioned to generally face toward the sun when the reflector is aligned with the sun. A shade extends at least partially in front of the first and second photodetectors for shading direct rays of sunlight therefrom when the reflector is aligned with the sun. As the sun moves to the west, the first photodetector becomes illuminated and generates a track signal, while the second photodetector remains shaded. If, due to cloudy bright conditions, diffused rays of sunlight illuminate the second photodetector, then it generates a stop signal. The control circuitry is responsive to the track signal and to the stop signal and enables the drive motor to rotate the reflector toward the west provided that the track signal is present and the stop signal is absent. Whenever the stop signal is present, the control circuitry disables the drive motor, thereby preventing runaway tracking under cloudy bright conditions.

Yet another aspect of the present invention is a solar lighting reflector apparatus adapted to seek the sun following extended hours of overcast conditions. Again, a first photodetector is provided for rotation with the reflector and is positioned to face the sun when the reflector is aligned therewith. A shade extends at least partially in front of the first photodetector for shading direct rays of sunlight therefrom when the reflector is properly aligned with the sun. As the sun progresses toward the west, the first photodetector is illuminated and generates a track signal for actuating the drive motor to rotate the reflector toward the west. A seek photodetector is also provided for rotation with the reflector but is directed generally away from the sun when the reflector is aligned with the sun. When the seek photodetector becomes illuminated, as would occur when the sun comes out from behind the clouds in the afternoon following morning overcast conditions, the seek photodetector generates a seek signal. The control circuitry is responsive to the seek signal for actuating the drive motor to rotate the reflector toward the west. As the reflector rotates toward the west, the first photodetector again becomes illuminated and generates the track signal to continue westward advancement of the reflector until the reflector is once again aligned with the sun.

DETAILED DESCRIPTION OF THE PREFERRED EMBODIMENTS

Figures 1, 2:
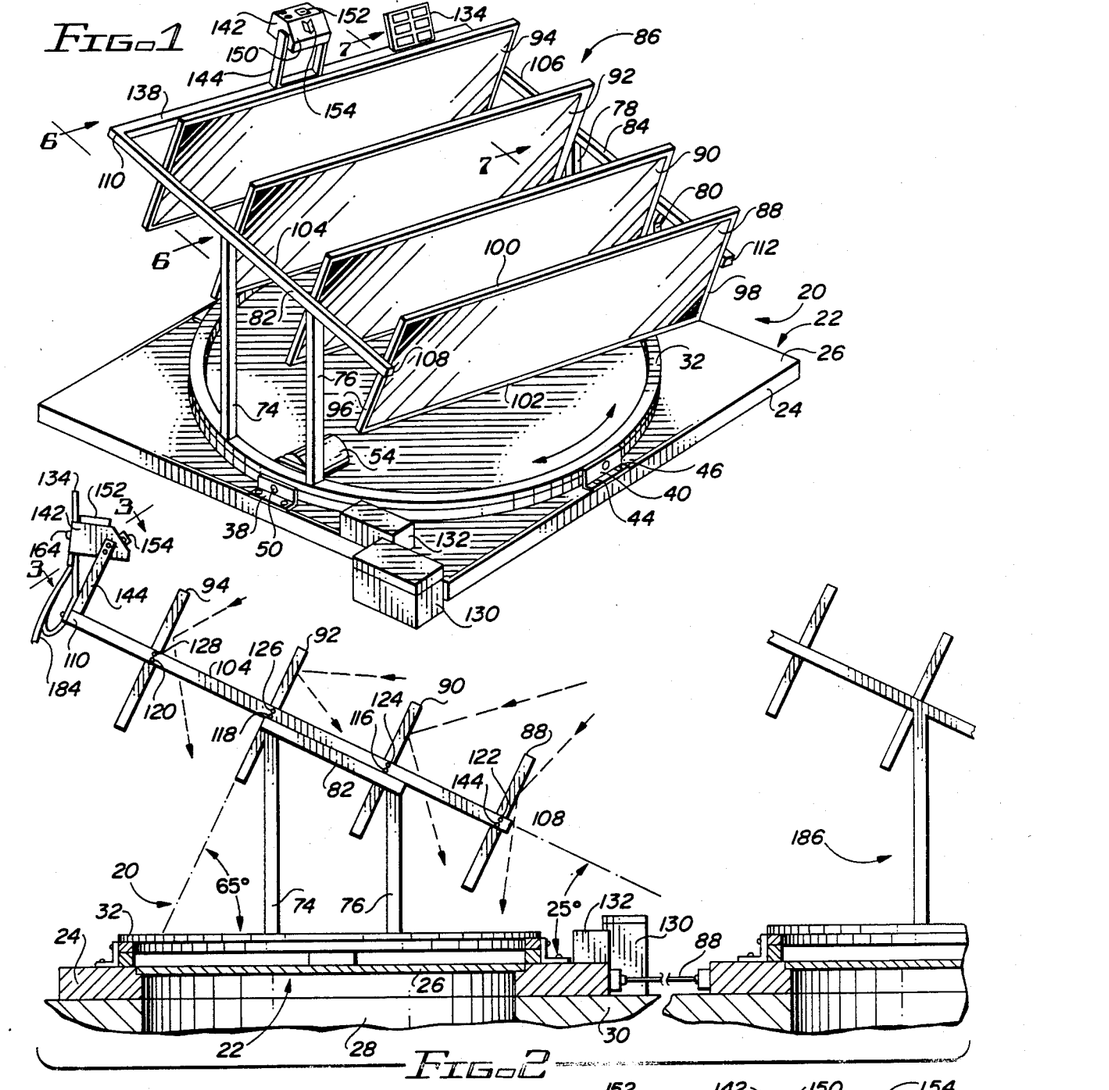
FIG. 1 is a perspective view of a solar lighting reflector apparatus including a slatted reflector assembly incorporating the teachings of the present invention.
FIG. 2 is a side view of the solar lighting reflector apparatus shown in FIG. 1 and further illustrates a partial side view of a further solar lighting reflector apparatus, or follower unit, controlled by the first such apparatus.

In FIG. 1, a solar lighting reflector apparatus is designated generally by reference numeral 20 includes a skylight 22 including a generally square metallic skylight frame 24 and a light transmissive plastic dome 26. As shown in FIG. 2, skylight 22 is positioned over a light transmissive opening 28 formed in the roof 30 of a building, the interior of which is to be illuminated by solar light.

Figure 9:
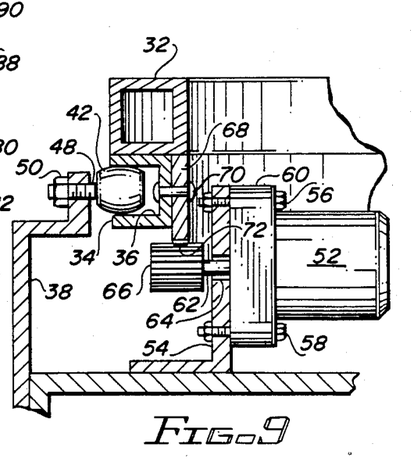
FIG. 9 is a sectional view of the lowermost portion of the solar lighting reflector apparatus and showing a horizontal drive motor intermeshed with a geared support ring that is rotatably mounted by a series of rollers.

Solar lighting reflector apparatus 20 includes a rotatable base, in the form of a support ring 32, which has a diameter commensurate with the dimensions of skylight 22. Referring briefly to FIG. 9, the support ring 32 is preferably formed from square channel aluminum tubing arcuately curved into a continuous ring. Secured to and extending below support ring 32 is a circular member 34 having the same diameter as support ring 32 and having a U-shaped channel 36 directed radially outward therefrom. As further shown in FIG. 9, a series of roller support brackets, such as 38 and 40, are provided midway along each side of skylight frame 24 for supporting a roller 42 that extends into channel 36 for rotatably supporting channel member 34 and support ring 32. Each support bracket is secured to skylight frame 24 by a pair of mounting screws, such as those designated by reference numerals 44 and 46 within FIG. 1 for roller bracket 40. Roller 42 is secured to bracket 38 by a bolt 48 secured by nut 50 (see FIG. 9).

As shown in FIGS. 1 and 9, a horizontal drive motor 52 is secured by a motor support bracket 54 to skylight frame 24 proximate roller bracket 38. Horizontal drive motor 52 is secured by a pair of bolts 56 and 58, and related nuts, to support bracket 54. Horizontal drive motor 52 may include a reduction gear box 60 for gearing down the power output of motor 52. Drive shaft 62 extends from gear box 60 through an aperture 64 formed in support bracket 54, and a drive gear 66 is secured to the end of output shaft 62. A ring-shaped gear 68 is secured to support ring 32 and channel member 34 by rivets 70 and includes gear teeth 72 along its lowermost circular edge for meshing with drive gear 66. Accordingly, as horizontal drive motor 52 is operated, drive gear 66 rotates, thereby causing support ring 32 to rotate in a horizontal plane in unison therewith. By properly controlling the operation of horizontal drive motor 52, support ring 32 can be rotated to any desired position between due east, as would be desired for sunrise, and due west, as would be required for early evening operation. Furthermore, horizontal drive motor 52 is reversible for returning support ring 32 from the westerly position back to the easterly position at the end of each day. Horizontal drive motor 52 is preferably a 12 volt D.C. reversible motor, whereby risks of electrical shock during installation and subsequent fire hazards following installation are substantially minimized. Moreover, horizontal drive motor 52 may then be powered by a conventional 12 volt storage battery.

Again referring to FIGS. 1 and 2, a pair of square tubular uprights 74 and 76 extend vertically upwardly from one side of support ring 32. A similar pair of square tubular uprights 78 and 80 extend upwardly from support ring 32 on the opposite side thereof. Upright 74 is taller than upright 76, and similarly, upright 78 is taller than upright 80, for reasons which will be explained below. A cross member 82, also formed of square tubing, extends from the upper end of upright 74 forwardly toward the upper end of upright 76. A similar cross member 84 extends between the upper ends of uprights 78 and 80 on the opposite side of the support ring 32. Cross members 82 and 84 preferably extend at an upwardly inclined angle of approximately 25° to the horizontal from their front ends toward their rear ends.

Still referring to FIGS. 1 and 2, a slatted reflector assembly is shown and is designated generally by reference numeral 86. Slatted reflector assembly 86 includes a series of four planar reflector panels, including frontmost panel 88, intermediate panels 90 and 92, and rearmost panel 94, each measuring approximately one foot in width and four feet in length. Each of the reflector panels 88–94 is preferably formed of twin-walled polycarbonate sheet material of the type commercially available from Rohm & Haas Corporation. Such twin-walled polycarbonate sheet material is lightweight, and is relatively immune to ultraviolet radiation and adverse weather conditions. Furthermore, the surface of each reflective panel lying closest to the dome 26 of skylight 22 is covered by a thin layer of reflective material, such as solar reflecting film of the type sold under the trademark SCOTCHCAL by 3M Corporation. In addition, aluminum edge strips, such as those designated as 96 and 98 along the side edges of frontmost panel 88, and 100 and 102 along the top and bottom edges, respectively, of panel 88, are provided to reinforce the edges of each panel. Each such edge strip is generally U-shaped for overlapping the front and rear faces of each reflector panel.

Each of the plurality of reflector panels 88–94 serves to reflect sunlight into skylight dome 26 for illuminating the interior of the building below. As shown in FIG. 1, each reflective panel 88–94 extends between first and second opposing ends along a generally horizontal longitudinal axis. For example, reflective panel 88 extends between a first end covered by edge strip 96 and a second end covered by edge strip 98. The horizontal longitudinal axes of reflective panels 88–94 all are parallel to one another. As is further shown in FIG. 1, the plurality of reflector panels 88–94 is generally supported by support ring 32 for rotation therewith in order that the reflector panels 88–94 may be continuously directed toward the sun.

Figure 8:
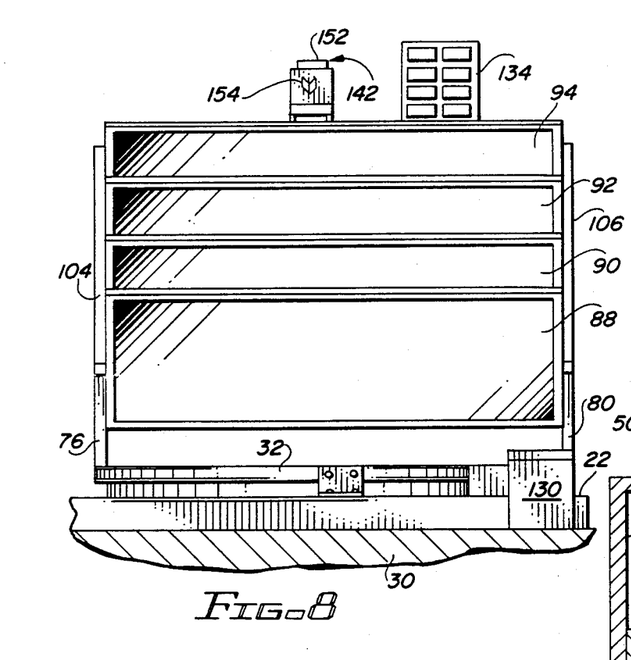
FIG. 8 is a front view of the solar lighting reflector apparatus shown in FIG. 1.

Reflector assembly 86 includes a pair of opposing linear side frame members 104 and 106 which are supported upon and fastened to cross members 82 and 84, respectively. Side frame members 104 and 106 extend generally parallel to each other above support ring 32 on opposing sides thereof for rotation therewith. As shown in FIG. 8, side frame members 104 and 106 are spaced apart from one another by approximately the diameter of support ring 32, which distance also corresponds to the length of each of the reflector panels 88–94. As shown in FIGS. 1 and 2, side frame member 104 extends from its front end 108 at an upwardly inclined angle toward its rear end 110. Side frame member 106 similarly extends from its front end 112 at the same upwardly inclined angle toward its rear end. Frontmost reflector panel 88 has its first end secured to front end 108 of side frame member 104 and its second end secured to the front end 112 of side frame member 106. Similarly, each of reflector panels 90, 92 and 94 has a first end secured to side frame member 104 and the opposing second end secured to side frame member 106.

Figures 6, 7:
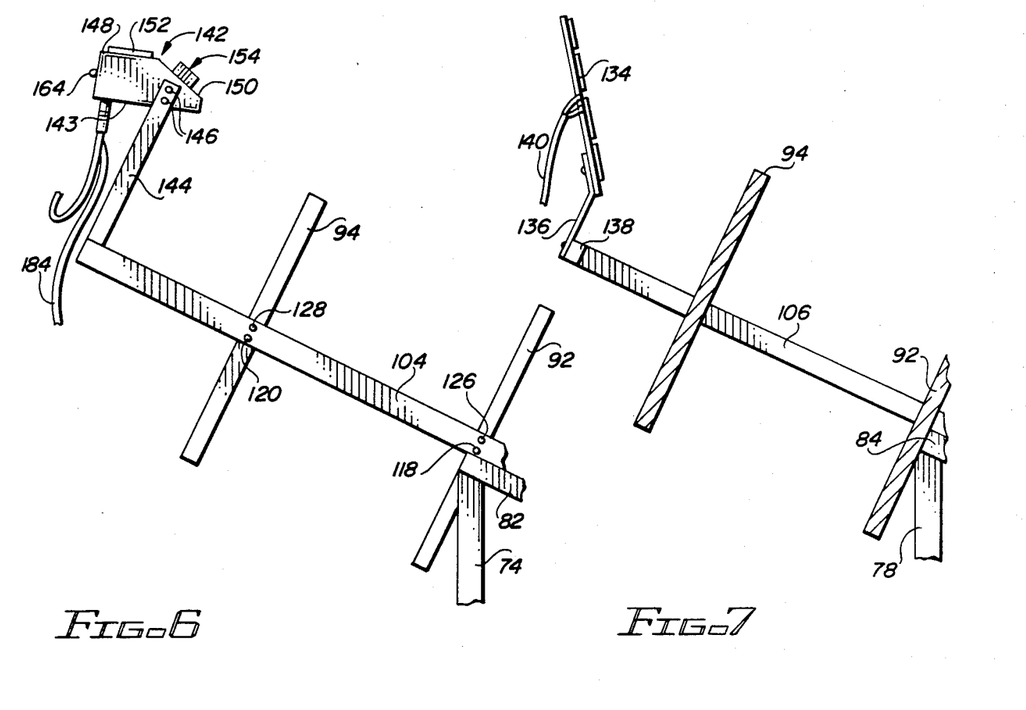
FIG. 6 is a partial side view of the rearmost portion of the reflector assembly, as taken through lines 6—6 shown in FIG. 1, including the control circuit box.
FIG. 7 is a sectional view taken through lines 7—7, as shown in FIG. 1, and illustrating a 12 volt photovoltaic panel used to generate electricity to charge a 12 volt storage battery.

Referring to FIGS. 1, 2, and 6, each of reflector panels 88–94 is secured along its first end to side frame member 104 by a first pivotal connection, designated by reference numerals 114, 116, 118, and 120, respectively, as well as by locking screws 122, 124, 126, and 128, respectively. Similar pivotal connections (not shown) secure the second ends of each of the reflector panels 88–94 to side frame member 106. To facilitate shipment of reflector assembly 86 as a compact unit, locking screws 122–128 are removed, and each of reflector panels 88–94 are rotated 90° from the position shown in FIGS. 1 and 2 for allowing such reflector panels to lie substantially within the plane defined by side frame members 104 and 106. Following shipment, and at the time of installation, each of the reflector panels is rotated to extend at 90° to side frame members 104 and 106, as shown in FIGS. 1, 2, and 6, and locking screws 122–128 are then inserted through aligned holes formed within side frame member 104 and the side edge strip of each reflector panel to lock the reflector panels in the operative position.

As mentioned above, cross members 82 and 84 are rearwardly inclined at an angle of approximately 25° to the horizontal. Accordingly, side frame members 104 and 106 also extend at a rearwardly inclined angle of approximately 25° to the horizontal. Since reflector panels 88–94 are locked at right angles to side frame members 104 and 106, each of reflector panels 88–94 extends at a forwardly inclined angle of approximately 65° to the horizontal, which is the angle most suited to reflect sunlight onto skylight dome 26. Moreover, by extending side frame members 104 and 106 at a rearwardly inclined angle of approximately 25°, the rearmost reflector panel 94 is positioned sufficiently above the preceding reflector panels so that it will not be significantly shaded thereby. To further prevent the leading panels from shading the trailing panels, pivotal connection points 114, 116, 118, and 120 are spaced apart from one another by a distance commensurate with the width of each reflector panel. Not only does such spacing prevent the leading reflector panels from shading the trailing reflector panels, but such spacing further facilitates the collapse and folding of the reflector panels into the plane of side frame members 104 and 106 for purposes of shipping.

Still referring to FIGS. 1 and 2, solar lighting reflector apparatus 22 includes a 12 volt storage battery 130 which may be conveniently placed adjacent skylight frame 24 upon the roof of the building. Storage battery 130 stores electrical power used to operate horizontal drive motor 52 for periodically rotating support ring 32 and reflector assembly 86 to follow daily east-to-west movement of the sun. Also shown in FIGS. 1 and 2 is a 12 volt relay box 132 secured upon skylight frame 24. As will be explained in greater detail below, 12 volt relay box 132 is electrically interconnected between storage battery 130 and horizontal drive motor 52 for selectively electrically coupling power thereto. Also shown in FIGS. 1, 2, and 7 is a 12 volt photovoltaic panel 134 which is electrically coupled directly to storage battery 130 for recharging the same during daylight hours. Photovoltaic panel 134 is mounted to reflector assembly 86 by a support bracket 136 which is in turn secured at its lower end to a rear support bar 138 which extends between the rearmost ends of side frame members 104 and 106. Within FIG. 7, dual conductor cable 140 is electrically coupled with the positive and negative terminals of storage battery 130.

As mentioned above, one of the aspects of the present invention relates to providing improved tracking circuitry for controlling the horizontal drive motor 52 to more accurately track movements of the sun and to avoid current drain upon the storage battery in order to operate such tracking circuitry. In this regard, solar lighting reflector apparatus 86 includes a relatively compact control box 142 which contains the bulk of the circuitry used to sense the position of the sun and to regulate the application of electrical power to horizontal drive motor 52. As shown in FIGS. 2 and 6, control box 142 is supported by an upwardly directed, U-shaped bracket 144, the upper arms of which engage the side walls of control box 142 and which are secured thereto by pairs of screws 146. Support bracket 144 positions control box 142 such that its bottom wall 143 is upwardly inclined from its front end to its rear end at an angle of approximately 5° to the horizontal. The top portion of control box 142 is divided into a first upwardly directed face 148 and a second forwardly directed face 150 which slopes down at an angle of approximately 25° from first face 148. First face 148 is essentially parallel to the bottom wall 143 of control box 142, and hence, lies at a 5° incline to the horizontal, while second face 150 forms an angle of approximately 30° with the horizontal. A 6 volt photovoltaic panel 152 is secured to first face 148 of control box 142 for generating a 6 volt direct current supply of electrical power for operating the electrical components contained within control box 142. Since control box 142 rotates along with reflector assembly 86, 6 volt photovoltaic panel 152 is always directed generally toward the sun and follows daily movements of the sun. In this manner, the electrical power needed by the tracking circuitry within control box 142 is provided completely independent from storage battery 130, thereby avoiding any drain of current from the storage battery when operating the tracking circuitry.

Figure 3:
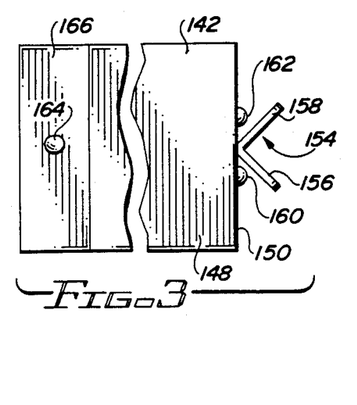
FIG. 3 is a top view of a control circuit box, taken through lines 3—3 as shown in FIG. 2, and showing first, second and third infrared photodetectors for controlling the rotation of the reflector assembly.
Figure 4:
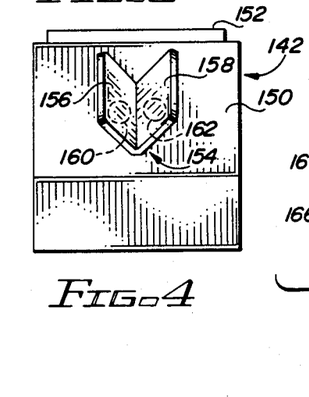
FIG. 4 is a front view of the control circuit box shown in FIG. 3.
Figure 5:
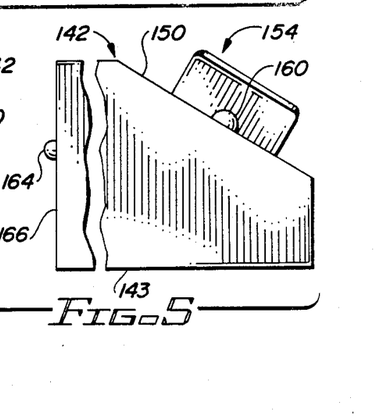
FIG. 5 is a side view of the control circuit box shown in FIGS. 3 and 4.

As best shown in FIGS. 3-5, a V-shaped shade device 154 extends forwardly from second face 150 of control box 142. Shade device 154 includes a pair of shade panels, including a first panel 156 and a second panel 158. Assuming that the reflector assembly 86 is facing south, shade panel 156 extends from second face 150 of control box 142 generally toward the west, while shade panel 158 extends from second face 150 toward the east, A first infrared photodetector 160 protrudes through second face 150 immediately behind shade panel 156. A second infrared photodetector 162 also protrudes through second face 150 immediately behind shade panel 158. Within FIG. 4, infrared photodetectors 160 and 162 are indicated by dashed circles, indicating the manner by which shade panels 156 and 158 extend over and shade infrared photodetectors 160 and 162, respectively. While any type of photodetectors may be used, photodetectors responsive to the infrared spectrum of solar radiation are preferred because infrared rays of sunlight are not as easily reflected or dispersed.

Infrared photodetector 160 is normally shaded by shade panel 156 from direct rays of sunlight shining upon second face 150 of control box 142 whenever reflector assembly 86, and hence control box 142, are directed toward the sun. Similarly, direct rays of sunlight are normally shaded from infrared photodetector 162 by shade 158. However, as the sun continues toward the west, shade 156 does not as effectively shadow infrared photodetector 160, and when infrared photodetector 160 receives a predetermined amount of light, it generates a track signal which is used by the control circuitry within control box 142 to activate horizontal drive motor 52 for rotating reflector assembly 86 clockwise. Similarly, in the event that infrared photodetector 162 is illuminated with a predetermined amount of light, it generates a stop signal which is used by the control circuitry within control box 142 to inhibit any further activation of horizontal drive motor 52.

As mentioned above, infrared photodetectors 160 and 162 protrude through control box 142 and, hence, are supported for rotation along with reflector assembly 86. Moreover, infrared photodetectors 160 and 162 generally face the sun as long as reflector assembly 86 is directed toward the sun. While shade panels 156 and 158 shadow infrared photodetectors 160 and 162 from direct sunlight when reflector assembly 86 is properly aligned with the sun, reflected and dispersed sunlight existing under cloudy-bright conditions can reach both infrared photodetectors 160 and 162 even though reflector assembly 86 is correctly positioned with respect to the sun. Under such conditions, infrared photodetector 160 becomes illuminated and generates the track signal. To avoid false tracking under such conditions, the stop signal generated by infrared photodetector 162 causes the control circuitry to disable horizontal drive motor 52, thereby preventing further tracking, until such cloudy-bright conditions are no longer present.

As shown in FIGS. 2, 3, 5 and 6, a third infrared photodetector 164 protrudes through a hole in the rear face 166 of control box 142. Like the first and second infrared photodetectors 160 and 162, the third photodetector is supported for rotation with reflector assembly 86. However, the third infrared photodetector 164 is positioned to face generally away from the sun when reflector assembly 86 is directed toward the sun. The third infrared photodetector 164 generates a seek control signal when it receives a predetermined amount of light, and the control circuitry within control box 142 is responsive to the seek signal, when combined with the absence of the aforementioned stop signal, to enable the horizontal drive motor 52 to rotate reflector assembly 86 clockwise toward the west to seek out the sun following extended hours of overcast conditions. For example, if the skies are cloudy early in the morning and stay overcast until mid-afternoon, direct rays of sunlight may strike control box 142 from the side or from behind, and fail to adequately illuminate infrared photodetector 160 to generate the track signal. Nonetheless, infrared photodetector 164 will be illuminated by the sun and will generate the seek signal to actuate horizontal drive motor 52. Before infrared photodetector 164 is turned totally away from the sun, direct rays of sunlight will begin to strike infrared photodetector 160, and thereby continue westward movement of the reflector assembly 86, until it is again directed toward the sun.

Under certain conditions, the seek photodetector 164 can be falsely triggered, as when bright white cumulonimbus clouds are positioned in the northern sky and reflect the sun positioned in the southern sky. A similar condition may exist if a relatively high, bright northern wall extends above the roof of the building on which solar lighting reflector apparatus 20 is installed and reflects sunlight from the southern sky. Nonetheless, westward tracking of reflector assembly 86 will continue only until reflector assembly 86 is just slightly west of the position of the sun, since infrared photodetector 162 will then be illuminated and generate the stop signal, disabling further operation of horizontal drive motor 52.

Figure 10:
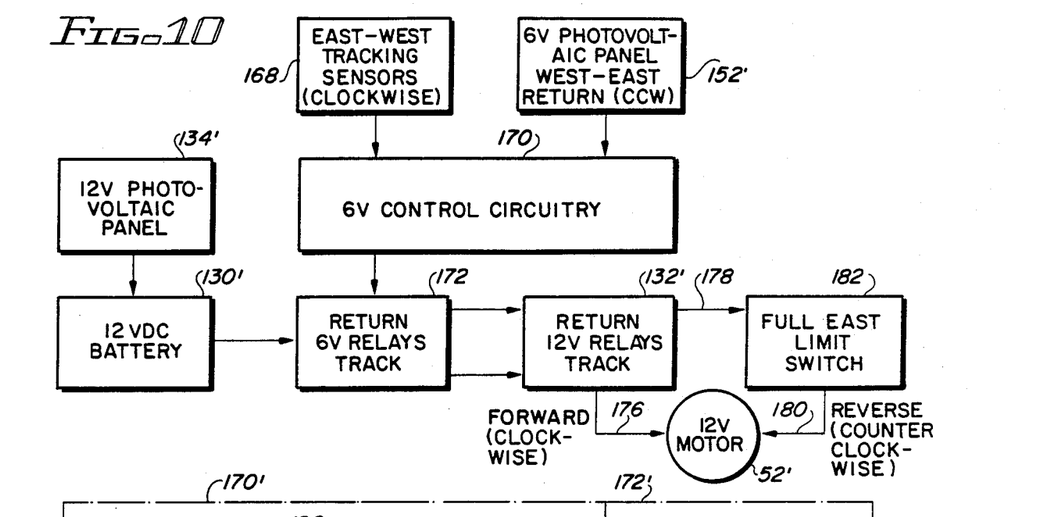
FIG. 10 is a block diagram of the circuitry used to control the operation of the horizontal drive motor.

FIG. 10 shows a block diagram indicating, in simplified form, the control circuitry used to operate horizontal drive motor 52. Within FIG. 10, the 12 volt photovoltaic panel 134 shown in FIG. 1 is represented by block 134', and the 12 volt storage battery 130 shown in FIG. 1 is designated by reference numeral 130'. As represented in FIG. 10, the 12 volt photovoltaic panel 134' is electrically coupled to and charges the 12 volt D.C. storage battery 130'. Also shown in FIG. 10 is a block 168, collectively representing infrared photodetectors 160, 162, and 164 which generate the track signal, stop signal, and seek signal, respectively, all of which signals are transmitted to 6 volt control circuitry block 170, representing control circuitry located within control box 142 (see FIG. 1). Also shown in FIG. 10 is 6 volt photovoltaic panel 152', representing the 6 volt photovoltaic panel 152 positioned atop control box 142. The 6 volt signal generated by photovoltaic panel 152' is also coupled to 6 volt control circuitry block 170 for powering the same. Not only does 6 volt photovoltaic panel block 152' supply electrical power to control circuitry block 170, but it also serves to indicate, by a decrease in its electrical output, the onset of darkness for triggering return of the reflector assembly 86 in a counterclockwise direction back toward due east. As shown in FIG. 10, control circuitry block 170 is coupled to 6 volt relay block 172 for selectively coupling the 12 volt D.C. storage battery 130' either directly to the horizontal drive motor, or to a second 12 volt relay block 132', corresponding to 12 volt relay box 132 of FIG. 1. The heavy duty relays within relay block 132' operate to selectively couple electrical power from storage battery 130' to the 12 volt horizontal drive motor 52'. The arrow designated by reference number 176 within FIG. 10 indicates that 12 volt relay block 132' can apply current across motor 52' to rotate reflector assembly 86 in a forward, or clockwise, direction. Similarly, the arrows designated by reference numerals 178 and 180 within FIG. 10 indicate that the 12 volt relay block 132' can apply current in the opposite direction through motor 52' to operate the motor in the reverse direction for returning reflector assembly 86 in the counterclockwise direction to point to the east. The block designated by reference numeral 182 designates a full-east limit switch which is opened when the reflector assembly 86 has fully returned to the east, thereby cutting off further power to the motor in the reverse direction, and preventing further counterclockwise rotation of reflector assembly 86.

In regard to FIG. 10, it will be noted that 6 volt control circuitry block 170 and 6 volt relays block 172 are both contained within control box 142 shown in FIG. 1. Electrical cabling 184, shown in FIGS. 2 and 6 interconnects the 6 volt relay block 172 with 12 volt relay block 132 (see FIG. 1). By providing heavy duty 12 volt relays within relay box 132, the control signals generated within control box 142 of a master solar lighting reflector apparatus may be simultaneously used to couple electrical power from storage battery 130 to a number of horizontal drive motors in a corresponding number of follower solar lighting reflector assemblies. For example, as shown in FIG. 2, solar lighting reflector assembly 20 may serve as a master which controls one or more follower units like that designated by reference numeral 186 in FIG. 2. Electrical cabling 188 extending between 12 volt relay box 132 and a horizontal drive motor (not shown) within follower unit 186 causes the follower unit to rotate in the same direction, at the same time, and by the same amount, as for horizontal drive motor 52 within solar lighting reflector apparatus 20.

Figure 11:
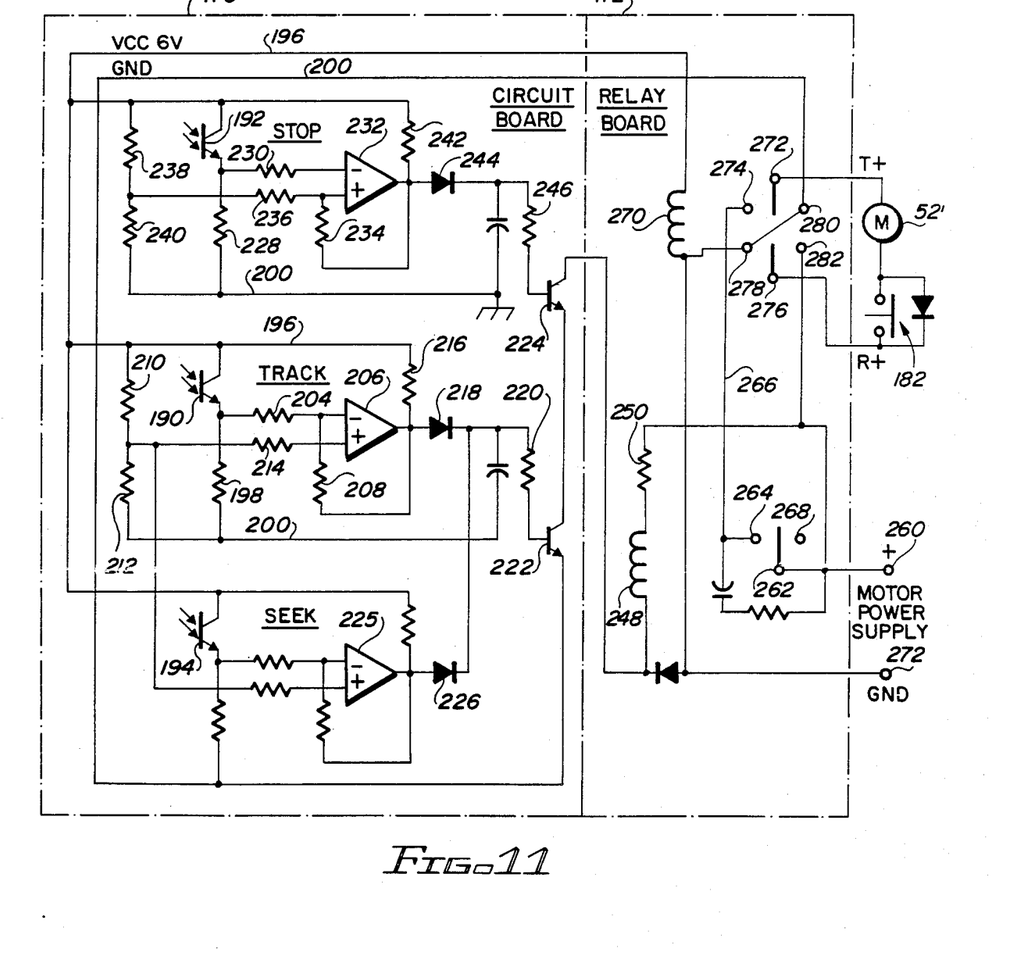
FIG. 11 is an electrical circuit schematic showing the electronic circuitry used to control the operation of the horizontal drive motor.

Turning to the circuit schematic shown in FIG. 11, the circuitry shown within dashed block 170' corresponds to the 6 volt control circuitry block 170 shown in FIG. 10; similarly, the components shown within dashed block 172' of FIG. 11 correspond with those represented by 6 volt relay block 172 in FIG. 10. For purposes of simplification, the schematic of FIG. 11 omits the 12 volt relay coils designated by block 132' of FIG. 10, and instead shows the 6 volt relay coils directly swithing storage battery 130 to motor 52'. Within FIG. 11, infrared phototransistor 190 corresponds with photodetector 160 shown in FIG. 3 for generating the track signal. Similarly, infrared phototransistor 192 corresponds with infrared photodetector 162 shown in FIG. 3 for generating the stop signal. Finally, infrared phototransistor 194 within FIG. 11, corresponds to infrared photodetector 164 shown in FIG. 3 for generating the seek signal.

Referring briefly to the generation of the track control signal, phototransistor 190 is coupled at its collector to conductor 196 which is in turn coupled to the positive terminal of the 6 volt electrical supply generated by the 6 volt photovoltaic panel 152'. The emitter of phototransistor 190 is coupled by a pull down resistor 198 to ground conductor 200, and is further connected by series resistor 204 to the positive input terminal of a hysteresis-type comparator 206, the hysteresiseffect being achieved by feedback resistor 208 coupled between the output of comparator 206 and the positive input terminal thereof. The negative terminal of comparator 206 is biased to approximately 4.5 volts by a voltage divider network formed by series connected resistors 210 and 212 coupled between 6 volt supply conductor 196 and ground conductor 200. A series resistor 214 couples the divided voltage to the negative input terminal of comparator 206. The output of comparator 206 is coupled by load resistor 216 to the positive supply conductor 196.

When phototransistor 190 is sufficiently illuminated, it becomes forward biased, pulling its emitter above the divided voltage of approximately 4.5 volts at the negative input terminal. In this event, the output of comparator 206 goes to a high level, corresponding to the generation of the track signal, and, causing diode 218 to become forward biased for supplying base drive current through base resistor 220 to the base of transistor 222. The emitter of transistor 222 is coupled to ground conductor 200, and the collector of transistor 222 is coupled to the emitter of a further transistor 224, the operation of which is explained below.

Those skilled in the art will appreciate that the operation of phototransistor 194 and its associated components is identical to that described above for phototransistor 190. Accordingly, whenever the seek phototransistor 194 is illuminated, comparator 225 goes to a high level, corresponding to the generation of the seek signal, and diode 226 becomes forward biased for supplying base drive current to transistor 222.

The components associated with phototransistor 192, which generates the aforementioned stop signal, is the reverse of that described above for generation of the track and seek signals. The collector of phototransistor 192 is again coupled to 6 volt supply conductor 196, and the emitter of phototransistor 192 is coupled by a pull-down resistor 228 to ground conductor 200. The emitter of phototransistor 192 is coupled by series resistor 230 to the negative input terminal of hysteresis-type comparator 232, such hysteresis effect being produced by feedback resistor 234 coupled between the output of comparator 232 and the positive input terminal thereof. The output of comparator 232 is coupled by a load resistor 242 to the positive supply conductor 196. The positive input terminal of comparator 232 is also coupled by a series resistor 236 to a further voltage divider network formed by resistor 238 and 240. The divided voltage produced at the junction of resistors 238 and 240 is again approximately 4.5 volts.

When phototransistor 192 is illuminated, the voltage at the emitter thereof rises above 4.5 volts, causing the output of comparator 232 to go low, corresponding to the generation of the stop signal. When the output of comparator 232 is low, diode 244 is turned off, and no base drive current can be supplied through base drive resistor 246 to the base of transistor 224. Accordingly, transistor 224 is held in its nonconductive state. However, when phototransistor 192 is not illuminated, the output of comparator 232 rises, thereby forward biasing diode 244 and providing base drive current to transistor 224 in order to render it conductive.

From the above description, it will be clear that transistor 224 will be in its conductive state so long as phototransistor 192 (infrared detector 162) is not illuminated. It should also be clear that transistor 222 will be rendered conductive whenever either phototransistor 190 (infrared detector 160) or phototransistor 194 (infrared detector 164) is illuminated. In the situation wherein both transistors 222 and 224 are conductive, the collector of transistor 224 draws current through 6 volt relay coil 248, and through current limiting resistor 250 form the positive terminal 260 of the 12 volt storage battery 130' (see FIG. 10) thereby causing relay switch contact 262 to be pulled into engagement with switch contact 264, and thereby coupling the +12 volt D.C. supply terminal 260 to conductor 266. Otherwise, if neither the track signal nor the seek signal is generated, or if the stop signal is present, no current will be conducted by 6 volt relay coil 248, and relay contact 262 will rest against open contact 268.

A second 6 volt relay coil 270 is coupled between 6 volt supply conductor 196 and ground terminal 272 of 12 volt storage battery 130 prime. As long as photovoltaic panel 152' (see FIG. 10) is receiving sunlight, current will flow through relay coil 270, thereby pulling switch contact 272 toward switch contact 274, and simultaneously pulling switch contact 276 toward switch contact 278. In this daytime mode, horizontal drive motor 52' is coupled between switch contact 264 and ground, via normally closed limit switch 182. Accordingly, the flow of current through horizontal drive motor 52' is completed whenever transistors 222 and 224 conduct current through relay coil 248, in order to advance the reflector assembly toward the west.

At sunset, photovoltaic panel 152' (see FIG. 10) decreases its electrical output, reducing the current flowing through relay coil 270, and permitting switch contacts 272 and 276 to return to contacts 280 and 282, respectively. In this event, switch contact 272 is coupled to ground potential, and switch contact 276 is coupled to the positive supply terminal 260 of the storage battery, thereby causing current to flow through horizontal drive motor 52' in the opposite direction until it returns the reflector assembly to the full due-east position, at which time full east limit switch 182 opens, thereby stopping the flow of current through horizontal drive motor 52'. The above-described operations are repeated on the subsequent day once photovoltaic panel 152' is sufficiently illuminated to energize relay coil 270.

Those skilled in the art will now appreciate that improved solar tracking reflector apparatus has been described wherein the slatted reflector assembly maintains a relatively low profile and presents decreased wind resistance by permitting wind to pass between the slats. Those skilled in the art will also appreciate that the construction of the reflector assembly allows it to be compacted into a planar shipping position which is easily converted to a deployed position upon installation.

It should also be appreciated that the slatted reflector assembly allows each of the reflective panels to catch early morning and late afternoon low-angled sunlight and evenly spreads such collected light across the surface of the skylight dome. Similarly, those skilled in the art will appreciate that noonday summer sun is partially shadowed by, and partially passes between the reflective panels, thereby more evenly distributing the entering light across the skylight dome. Moreover, the elimination of the need to raise and lower the reflector assembly in the morning and in the evening, respectively, serves to avoid the need for a vertical drive motor and associated geared rack arms, and permits the use of a smaller storage battery and smaller photovoltaic panel for charging the same.

Those skilled in the art will also appreciate that, by providing a second smaller photovoltaic panel to drive the tracking and control circuitry independent of the storage battery, continuous current drain upon the storage battery is eliminated. Also eliminated is the need for a separate darkness sensor, since the 6 volt photovoltaic panel itself serves to control the relay that causes the reflector assembly to rotate back to the east at the end of each day.

Those skilled in the art should also appreciate that the provision of paired infrared photodetectors 160 and 162 for generating a tracking signal and an overriding stop signal, as described above, prevents cloudy-bright conditions from falsely tracking the sun. The provision of the infrared photodetector 164 for generating the seek signal permits the control circuitry to seek out the position of the sun following extended hours of overcast.

While the present invention has been described with reference to a preferred embodiment thereof, the description is for illustrative purposes only and is not to be construed as limiting the scope of the invention. Various modifications and changes may be made by those skilled in the art without departing from the true spirit and scope of the invention as defined by the appended claims.

I claim:

1. A solar lighting reflector apparatus for illuminating the interior of a roofed building during daylight hours and adapted to follow daily movements of the sun, the roofed building having a light transmissive opening in the roof therein, said apparatus comprising in combination:

a. a base;

b. means for rotatably supporting the base above the light transmissive opening of the roofed building;

c. a plurality of generally planar reflective panels for reflecting sunlight into the light transmissive opening, each of the reflective panels extending between first and second opposing ends along a generally horizontal longitudinal axis, the longitudinal axes of the plurality of reflective panels being parallel to each other, each of the plurality of reflective panels being supported by the base for rotation therewith, the plurality of reflective panels including at least a frontmost reflective panel and a rearmost reflective panel;

d. the rearmost reflective panel being supported at a higher elevation than the frontmost reflective panel to avoid shading of the rearmost reflective panel by the frontmost reflective panel; and e. tracking means for rotating the base to direct the reflective panels toward the sun as the sun moves throughout each day.

2. A solar lighting reflector apparatus as recited by claim 1 further including a pair of opposing side frame members extending generally parallel to each other, the pair of side frame members being supported above the base on opposing sides thereof for rotation therewith and being spaced apart from each other by a predetermined distance, each of the side frame members extending between a front end and a rear end thereof, each of the side frame members being inclined upwardly from the front end thereof toward the rear end thereof, and wherein each of the plurality of reflective panels is secured at its first end to one of the side frame members and is secured at its second end to the other of the side frame members.

3. A solar lighting reflector apparatus as recited by claim 2 wherein each of the side frame members is substantially linear and wherein each of the reflective panels lies in a plane that is substantially perpendicular to the side frame members.

4. A solar lighting reflector apparatus as recited by claim 3 wherein each of the reflective panels lies in a plane that is inclined at approximately 65° to the horizontal, and wherein the side frame members are oppositely inclined at approximately 25° to the horizontal.

5. A solar lighting reflector apparatus as recited by claim 2 wherein each of the side frame members is substantially linear and wherein each of the reflective panels is secured to the side frame members about a pivotal connection for allowing each of the reflective panels to be pivoted to an inoperative position lying substantially within the plane defined by the side frame members for providing a compact unit for shipping.

6. A solar lighting reflector apparatus as recited by claim 5 wherein the side frame members include lock means for selectively locking each of the reflective panels in an operative position in a plane that is substantially perpendicular to the side frame members.

7. A solar lighting reflector apparatus as recited by claim 1 wherein each of the reflective panels has a width dimension measured perpendicular to its longitudinal axis, the reflective panels having a common predetermined width, and wherein each reflective panel is spaced apart from adjacent reflective panels by substantially said predetermined width.

8. A solar lighting reflector apparatus as recited by claim 4 wherein each of the reflective panels has a width dimension measured perpendicular to its longitudinal axis, the reflective panels having a common predetermined width, and wherein each reflective panel is spaced apart from adjacent reflective panels by substantially said predetermined width to further minimize shading of one reflective panel by another reflective panel in front thereof.

9. A solar lighting reflector apparatus as recited by claim 5 wherein each of the reflective panels has a width dimension measured perpendicular to its longitudinal axis, the reflective panels having a common predetermined width, and wherein each reflective panel is spaced apart from adjacent reflective panels by substantially said predetermined width to further minimize shading of one reflective panel by another reflective panel in front thereof, and for permitting the reflective panels to be pivoted within the plane defined by the side frame members.

10. A solar lighting reflector apparatus for illuminating the interior of a roofed building during daylight hours and adapted to follow daily movements of the sun, the roofed building having a light transmissive opening in the roof therein, said apparatus comprising in combination:

a. a base;

b. means for rotatably supporting the base above the light transmissive opening of the roofed building;

c. reflector means secured to the base for rotation therewith, the reflector means reflecting solar light into the light transmissive opening;

d. a drive motor for rotating the base and the reflector means along therewith;

e. a storage battery for storing electrical power used to operate the drive motor;

f. a first photovoltaic panel for generating electrical power to charge the storage battery;

g. tracking means for detecting the position of the sun and for generating at least one control signal in response thereto;

h. control means responsive to the at least one control signal for selectively coupling electrical power from the storage battery to the drive motor for rotating the base and the reflector means to follow daily movements of the sun; and i. a second photovoltaic panel electrically coupled to the tracking means and control means for supplying electrical power thereto, whereby the tracking means and control means avoid draining electrical power from the storage battery.

11. A solar lighting apparatus as recited by claim 10 wherein the first and second photovoltaic panels are mounted to the reflector means for rotation therewith to follow daily movement of the sun.

12. A solar lighting apparatus as recited by claim 10 wherein the electrical output of the second photovoltaic panel decreases at the end of each day as the sun sets, and wherein the control means is responsive to the decreased electrical output of the second photovoltaic panel for operating the drive motor to rotate the base and the reflector means toward the east to face the sun on the following morning.

13. A solar lighting reflector apparatus for illuminating the interior of a roofed building during daylight hours and adapted to follow daily movements of the sun, the roofed building having a light transmissive opening in the roof therein, said apparatus comprising in combination:

a. a base;

b. means for rotatably supporting the base above the light transmissive opening of the roofed building;

c. reflector means secured to the base for rotation therewith, the reflector means reflecting solar light into the light transmissive opening;

d. a drive motor for rotating the base and the reflector means along therewith;

e. first photodetector means for generating a track signal when the first photodetector means receives a first predetermined amount of light;

f. second photodetector means for generating a stop signal when the second photodetector means receives a second predetermined amount of light;

g. the first and second photodetector means being supported for rotation with the reflector means and being positioned to generally face the sun when the reflector means is directed toward the sun;

h. a shade extending at least partially in front of the first and second photodetector means for shading direct rays of sunlight from the first and second photodetector means when the reflector means is directed toward the sun, the shade permitting sunlight to illuminate the first photodetector means when the reflector means is directed to the east of the current position of the sun, the shade permitting sunlight to illuminate the second photodetector means when the reflector means is directed to the west of the current position of the sun, the shade further permitting diffused sunlight under cloudy-bright conditions to illuminate both the first photodetector means and the second photodetector means; and i. control circuitry for selectively applying electrical power to the drive motor for rotating the reflector means toward the west, the control circuitry being responsive to the presence of the track signal combined with the absence of the stop signal for enabling the drive motor to rotate the reflector means toward the west, the control circuitry being responsive to the presence of the stop signal for disabling the drive motor even when the track signal is present, to prevent false tracking under cloudy-bright conditions.

14. A solar lighting reflector apparatus as recited by claim 13 further including a third photodetector means for generating a seek signal when the third photodetector means receives a third predetermined amount of light, the third photodetector means being supported for rotation with the reflector means and being positioned to face generally away from the sun when the reflector means is directed toward the sun; and wherein said control circuitry is responsive to the presence of the seek signal combined with the absence of the stop signal for enabling the drive motor to rotate the reflector means toward the west to seek out the sun following extended hours of overcast conditions.

15. A solar lighting reflector apparatus as recited by claim 13 further including a photovoltaic panel electrically coupled to the control circuitry for supplying electrical power thereto, the electrical output of the photovoltaic panel decreasing at the end of each day as the sun sets, and wherein the control circuitry is responsive to the decreased electrical output of the photovoltaic panel for operating the drive motor to rotate the reflector means toward the east to face the sun on the following morning.

16. A solar lighting reflector apparatus for illuminating the interior of a roofed building during daylight hours and adapted to follow daily movements of the sun, the roofed building having a light transmissive opening in the roof therein, said apparatus comprising in combination:

a. a base;

b. means for rotatably supporting the base above the light transmissive opening of the roofed building;

c. reflector means secured to the base for rotation therewith, the reflector means reflecting solar light into the light transmissive opening;

d. a drive motor for rotating the base and the reflector means along therewith;

e. first photodetector means for generating a track signal when the first photodetector means receives a first predetermined amount of light;

f. the first photodetector means being supported for rotation with the reflector means and being positioned to generally face the sun when the reflector means is directed toward the sun;

g. a shade extending at least partially in front of the first photodetector means for shading direct rays of sunlight from the first photodetector means when the reflector means is directed toward the sun, the shade permitting sunlight to illuminate the first photodetector means when the reflector means is directed to the east of the current position of the sun;

h. a second photodetector means for generating a seek signal when the second photodetector means receives a second predetermined amount of light, the second photodetector means being supported for rotation with the reflector means and being positioned to face generally away from the sun when the reflector means is directed toward the sun; and i. control circuitry for selectively applying electrical power to the drive motor for rotating the reflector means toward the west when either the track signal is present or the seek signal is present to seek out the sun following extended hours of overcast conditions.

17. A solar lighting reflector apparatus as recited by claim 16 further including a photovoltaic panel for generating electrical power to operate the control circuitry, the electrical output of the photovoltaic panel decreasing at the end of each day as the sun sets, and wherein the control circuitry is responsive to the decreased electrical output of the photovoltaic panel for operating the drive motor to rotate the reflector means toward the east to face the sun on the following morning.

* * * * *